(12) United States Patent
Inagaki et al.

(10) Patent No.: US 12,215,972 B2
(45) Date of Patent: Feb. 4, 2025

(54) SENSOR DEVICE

(71) Applicant: NITTO DENKO CORPORATION, Ibaraki (JP)

(72) Inventors: Junichi Inagaki, Ibaraki (JP); Takeshi Murashige, Ibaraki (JP); Keisuke Sato, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 491 days.

(21) Appl. No.: 17/424,429

(22) PCT Filed: Feb. 10, 2020

(86) PCT No.: PCT/JP2020/005156
§ 371 (c)(1),
(2) Date: Jul. 20, 2021

(87) PCT Pub. No.: WO2020/179376
PCT Pub. Date: Sep. 10, 2020

(65) Prior Publication Data
US 2022/0090904 A1    Mar. 24, 2022

(30) Foreign Application Priority Data
Mar. 6, 2019   (JP) .................................. 2019-040427

(51) Int. Cl.
*G01B 7/16* (2006.01)
*B32B 17/10* (2006.01)
(Continued)

(52) U.S. Cl.
CPC ................ *G01B 7/16* (2013.01); *B32B 17/10* (2013.01); *C09J 7/38* (2018.01); *G01L 1/22* (2013.01);
(Continued)

(58) Field of Classification Search
CPC ..... G01L 1/16; G01L 1/18; G01L 1/22; G01L 1/205; G01L 1/2287; G01B 7/16;
(Continued)

(56) References Cited

U.S. PATENT DOCUMENTS

| 8,947,368 B2 | 2/2015 | Jeong et al. |
| 10,303,280 B2 | 5/2019 | Hong et al. |

(Continued)

FOREIGN PATENT DOCUMENTS

| CN | 104335085 A | 2/2015 | |
| CN | 106201085 A | * 12/2016 | ............. G06F 3/045 |

(Continued)

OTHER PUBLICATIONS

International Search Report dated May 12, 2020, issued in counterpart International Application No. PCT/JP2020/005156. (2 pages).

(Continued)

*Primary Examiner* — Benjamin R Schmitt
(74) *Attorney, Agent, or Firm* — WHDA, LLP

(57) ABSTRACT

Provided is a sensor device in which the sensitivity of a strain sensor is hardly inhibited despite the fact that a glass material is used as a protective material, and in which the glass material hardly breaks. The sensor device of the present invention includes: an optical laminate including a glass film, an adhesive layer, a resin layer, and a pressure-sensitive adhesive layer in the stated order; and a strain-sensing unit, wherein the glass film has a thickness of from 20 μm to 150 μm. In one embodiment, the strain-sensing unit is arranged on a pressure-sensitive adhesive layer side of the optical laminate.

5 Claims, 1 Drawing Sheet

(51) Int. Cl.
*C09J 7/38* (2018.01)
*G01L 1/22* (2006.01)
*G02B 5/30* (2006.01)
*G06F 3/041* (2006.01)
*G01L 1/20* (2006.01)

(52) U.S. Cl.
CPC ............ *G02B 5/30* (2013.01); *G06F 3/0412* (2013.01); *B60G 2401/12* (2013.01); *G01L 1/205* (2013.01)

(58) Field of Classification Search
CPC .......... G01B 7/18; B32B 17/10; B32B 7/022; B32B 27/36; B32B 27/08; B32B 2307/412; B60G 2401/12
See application file for complete search history.

(56) References Cited

U.S. PATENT DOCUMENTS

| | | |
|---|---|---|
| 11,198,274 B2 | 12/2021 | Murashige et al. |
| 2010/0182252 A1 | 7/2010 | Jeong et al. |
| 2015/0146294 A1 | 5/2015 | Watanabe |
| 2018/0035923 A1 | 2/2018 | Kang et al. |
| 2018/0081478 A1 | 3/2018 | Hong et al. |
| 2018/0203173 A1 | 7/2018 | Murashige et al. |
| 2020/0012130 A1 | 1/2020 | Tamada et al. |
| 2021/0178740 A1 | 6/2021 | Murashige et al. |

FOREIGN PATENT DOCUMENTS

| | | | |
|---|---|---|---|
| CN | 107848264 A | 3/2018 | |
| JP | 2010-164938 A | 7/2010 | |
| JP | 2013-037207 A | 2/2013 | |
| JP | 2017-024177 A | 2/2017 | |
| JP | 2017-24386 A | 2/2017 | |
| JP | 2017-039227 A | 2/2017 | |
| JP | 2017-219392 A | 12/2017 | |
| JP | 2018-185346 A | 11/2018 | |
| KR | 10-2018-0031896 A | 3/2018 | |
| WO | 2011/125408 A1 | 10/2011 | |
| WO | WO-2015146367 A1 * | 10/2015 | ............... G01L 1/16 |
| WO | WO-2017010499 A1 * | 1/2017 | ............. B32B 17/06 |
| WO | 2018/190208 A1 | 10/2018 | |
| WO | 2019/087938 A1 | 5/2019 | |
| WO | 2021/060107 A1 | 4/2021 | |
| WO | 2021/095516 A1 | 5/2021 | |

OTHER PUBLICATIONS

Extended (Supplementary) European Search Report dated Oct. 11, 2022, issued in counterpart EP application No. 20766221.4. (7 pages).

Office Action dated Sep. 21, 2022, issued in counterpart CN application No. 202080018642.8, with English translation. (14 pages).

Office Action dated Mar. 26, 2024, issued in counterpart JP application No. 2021-503491, with English translation. (6 pages).

Office Action dated Sep. 20, 2024, issued in counterpart KR application No. 10-2021-7026823, with English translation. (9 pages).

* cited by examiner

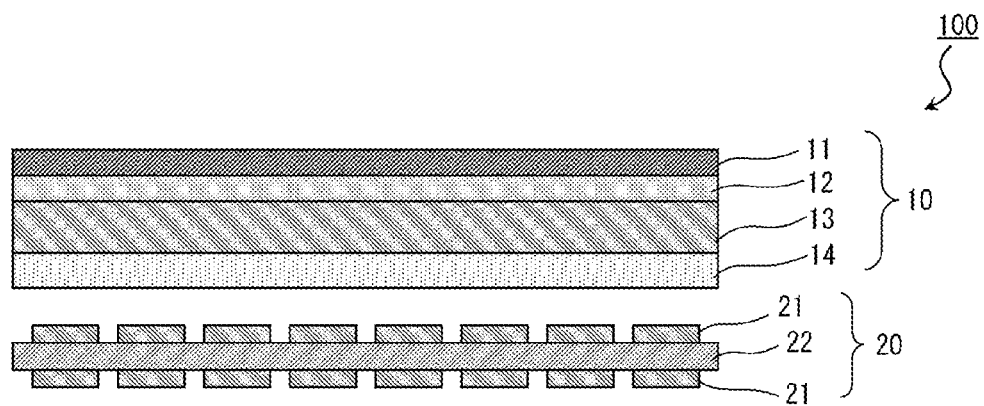

SENSOR DEVICE

TECHNICAL FIELD

The present invention relates to a sensor device.

BACKGROUND ART

Electronic devices mounted with touch panels have been spreading in recent years. As one of such electronic devices, an electronic device mounted with a strain sensor has been investigated, and in the electronic device, a touch position is detected by the strain sensor.

Meanwhile, in many cases, a protective material is arranged on the outermost surface (touch surface) of the electronic device for protecting the device. A glass plate or a plastic plate has been used as the protective material (e.g., Patent Literature 1). In particular, the glass plate is useful because of its excellent hardness, and hence has been frequently used. In addition, tempered glass improved in strength as compared to typical glass is sometimes used in the glass plate. However, the tempered glass tends to be thick for securing its strength, and the use of the thick protective material involves a problem in that the sensitivity of the strain sensor reduces.

CITATION LIST

Patent Literature

[PTL 1] JP 2010-164938 A

SUMMARY OF INVENTION

Technical Problem

The present invention has been made to solve the problem of the related art, and an object of the present invention is to provide a sensor device in which the sensitivity of a strain sensor is hardly inhibited despite the fact that a glass material is used as a protective material, and in which the glass material hardly breaks.

Solution to Problem

According to one embodiment of the present invention, there is provided a sensor device, including: an optical laminate including a glass film, an adhesive layer, a resin layer, and a pressure-sensitive adhesive layer in the stated order; and a strain-sensing unit, wherein the glass film has a thickness of from 20 μm to 150 μm.

In one embodiment, the strain-sensing unit is arranged on a pressure-sensitive adhesive layer side of the optical laminate.

In one embodiment, the glass film and the resin layer are arranged while no layer other than the adhesive layer is caused to exist between the glass film and the resin layer.

In one embodiment, the resin layer is a polarizing plate.

In one embodiment, the resin layer has a modulus of elasticity at 23° C. of from 1 GPa to 10 GPa.

Advantageous Effects of Invention

According to the present invention, the sensor device in which the sensitivity of a strain sensor is hardly inhibited despite the fact that a glass material is used as a protective material, and in which the glass material hardly breaks can be provided.

BRIEF DESCRIPTION OF DRAWINGS

FIG. 1 is a schematic sectional view of a sensor device according to one embodiment of the present invention.

DESCRIPTION OF EMBODIMENTS

A. Overall Configuration of Sensor Device

FIG. 1 is a schematic sectional view of a sensor device according to one embodiment of the present invention. A sensor device 100 of FIG. 1 includes: an optical laminate 10 including a glass film 11, an adhesive layer 12, a resin layer 13, and a pressure-sensitive adhesive layer 14 in the stated order; and a strain-sensing unit 20. The strain-sensing unit 20 is arranged on the pressure-sensitive adhesive layer 14 side of the optical laminate 10. The thickness of the glass film 11 is from 20 μm to 150 μm. It is preferred that the glass film 11 and the resin layer 13 be arranged directly via the adhesive layer 12 (i.e., while no layer other than the adhesive layer 12 is caused to exist between the glass film 11 and the resin layer 13).

The optical laminate 10 includes the glass film 11, and hence has high hardness. In an electronic device including the sensor device of the present invention, the optical laminate 10 may be arranged so that the glass film 11 may serve as the outermost surface. The use of the optical laminate 10 including the glass film 11 can effectively protect the electronic device including the sensor device of the present invention. In addition, the optical laminate 10 includes the resin layer 13 on one side of the glass film 11, and hence the breakage of the glass film 11 can be prevented, and the laminate is excellent in impact resistance and puncture resistance. In the present invention, the laminate is considered to be excellent in impact resistance as described above because impact applied to the surface of the glass film 11 can be effectively caused to escape toward the resin layer 13. In addition, the glass film 11 has a function of protecting the resin layer 13. That is, in the present invention, the glass film 11 and the resin layer 13 protect each other. Accordingly, the number of members for protection can be reduced, and hence a lightweight and thin optical laminate can be obtained.

Further, in the present invention, the thin glass film 11 can be adopted, and hence the sensing sensitivity of the strain-sensing unit 20 is hardly inhibited. The strain-sensing unit 20 includes strain sensors 21, and the strain sensors 21 each read a resistance value, which changes at the time of the occurrence of strain in the strain-sensing unit 20, to detect a strain amount. In actuality, an external force applied from the glass film 11 side deflects the strain-sensing unit 20, and hence the strain amount is detected. In general, when it is assumed that an external force is applied to the center of the sample (glass film) supported at two points, its strain amount is represented by the expression "{(external force)×(distance between support points)$^3$}/{48×(modulus of elasticity of sample)×(second moment of area}." Further, the second moment of area of the sample at this time is represented by the expression "{(sample depth)×(sample thickness)$^3$}/12," and is hence proportional to the cube of the thickness of the sample. That is, the strain amount is inversely proportional to the cube of the thickness of the sample (glass film). In the present invention, the thin glass film can be used when combined with the resin layer, and as a result, a sensor device in which the sensitivity of its strain-sensing unit is hardly inhibited can be provided.

The sensor device of the present invention may further include any appropriate other member to the extent that the effect of the present invention is obtained, though the member is not shown. For example, a liquid crystal cell, a member for a display, such as an organic light-emitting display, or an optical film, such as a polarizing plate, may be arranged between the optical laminate and the strain-sensing unit.

B. Optical Laminate

As described above, the optical laminate includes a glass film, an adhesive layer, a resin layer, and a pressure-sensitive adhesive layer in the stated order. The optical laminate may further include other layers. Examples of the other layers include an antireflection layer, an antiglare layer, an antistatic layer, and a conductive layer.

The thickness of the optical laminate is preferably from 60 μm to 550 μm, more preferably from 100 μm to 300 μm.

B-1. Glass Film

Any appropriate glass film may be adopted as the glass film. According to classification based on composition, examples of the glass film include soda-lime glass, borate glass, aluminosilicate glass, and quartz glass films. In addition, according to classification based on an alkali component, examples of the glass film include alkali-free glass and low-alkali glass films. The content of an alkali metal component (e.g., $Na_2O$, $K_2O$, $Li_2O$) in the glass is preferably 15 wt % or less, more preferably 10 wt % or less.

The thickness of the glass film is from 20 μm to 150 μm, preferably from 30 μm to 150 μm, more preferably from 50 μm to 100 μm. When the thickness falls within such ranges, an optical laminate having the following features can be obtained: the optical laminate is excellent in flexibility; and the glass film hardly breaks, and hence the laminate is excellent in productivity.

The glass film preferably has a light transmittance at a wavelength of 550 nm of 85% or more. The glass film preferably has a refractive index at a wavelength of 550 nm of from 1.4 to 1.65.

The glass film has a density of preferably from 2.3 $g/cm^3$ to 3.0 $g/cm^3$, more preferably from 2.3 $g/cm^3$ to 2.7 $g/cm^3$. When the glass film has a density falling within the ranges, a lightweight optical laminate is obtained.

Any appropriate method may be adopted as a forming method for the glass film. The glass film is typically produced by melting a mixture containing a main raw material, such as silica or alumina, a fining agent, such as salt cake or antimony oxide, and a reducing agent, such as carbon, at a temperature of from 1,400° C. to 1,600° C., and forming the molten mixture into a thin sheet shape, followed by cooling. Examples of the forming method for the glass film include a slot down-draw method, a fusion method, and a float method. The glass film formed in a sheet shape by any one of those methods may be chemically polished with a solvent, such as hydrofluoric acid, as required, in order to reduce its thickness or enhance its smoothness.

B-2. Adhesive Layer

The term "adhesive layer" as used herein refers to a layer capable of bonding substances to each other by being interposed between the substances. Accordingly, when an adherend bonded to the adhesive layer is peeled, the adhesive layer is free of any practical adhesive strength. Meanwhile, the term "pressure-sensitive adhesive layer" refers to a substance that has an adhesive property at normal temperature, and that is bonded to an adherend with a light pressure. Accordingly, even when the adherend bonded to the pressure-sensitive adhesive layer is peeled, the pressure-sensitive adhesive layer holds a practical pressure-sensitive adhesive strength. In the present invention, the glass film and the resin layer are laminated via the adhesive layer, and hence both of the glass film and the resin layer can be effectively protected.

The adhesive layer is formed of any appropriate adhesive. Examples of the adhesive include a polyester-based adhesive, a polyurethane-based adhesive, a polyvinyl alcohol-based adhesive, and an epoxy-based adhesive. Of those, an epoxy-based adhesive is preferred. This is because particularly satisfactory adhesiveness can be obtained.

In one embodiment, a curable adhesive, such as a thermosetting, photocurable, or moisture-curable adhesive, is used as the adhesive. When the adhesive is a thermosetting adhesive, the adhesive layer can exhibit a peel-resisting force by being cured (solidified) through heating. In addition, when the adhesive is a photocurable adhesive, such as a UV-curable adhesive, the adhesive layer can exhibit a peel-resisting force by being cured through irradiation with light, such as UV light. In addition, when the adhesive is a moisture-curable adhesive, the adhesive may react with, for example, moisture in air to cure. Accordingly, the adhesive layer can cure to exhibit a peel-resisting force even by being left to stand.

For example, a commercial adhesive may be used as the adhesive, or the adhesive may be prepared as an adhesive solution (or dispersion liquid) by dissolving or dispersing various curable resins in a solvent.

The thickness of the adhesive layer is preferably from 0.1 μm to 30 μm, more preferably from 0.5 μm to 20 μm, still more preferably from 1 μm to 10 μm. When the thickness falls within such ranges, an optical laminate that is excellent in flexibility and is excellent in puncture resistance can be obtained.

The modulus of elasticity of the adhesive layer at 23° C. is preferably from 0.5 GPa to 15 GPa, more preferably from 0.8 GPa to 10 GPa, still more preferably from 1 GPa to 5 GPa. When the modulus of elasticity falls within such ranges, an optical laminate that is excellent in flexibility and is excellent in puncture resistance can be obtained. Herein, the modulus of elasticity may be measured with an autograph under the following conditions.

<Method of Measuring Modulus of Elasticity>

| | |
|---|---|
| Measurement temperature: | 23° C. |
| Sample size: | 50 μm thick by 2 cm wide by 15 cm long |
| Chuck-to-chuck distance: | 10 cm |
| Tensile rate: | 10 mm/min |

B-3. Resin Layer

Examples of the resin layer include a polarizing plate, a retardation plate, an isotropic film, and a conductive film. The resin film may include a single layer, or may include a plurality of layers.

Any appropriate material is used as a material for forming the resin layer. Examples of the material for forming the resin layer include a polyolefin-based resin, a cyclic olefin-based resin, a polycarbonate-based resin, a cellulose-based resin, a polyester-based resin, a polyamide-based resin, a polyimide-based resin, a polyether-based resin, a polystyrene-based resin, a (meth)acrylic resin, a (meth)acrylic urethane-based resin, a polysulfone-based resin, an acetate-based resin, an epoxy-based resin, a silicone-based resin, a polyarylate-based resin, a polysulfone-based resin, a polyetherimide-based resin, an epoxy-based resin, a urethane-based resin, a silicone-based resin, and a polyvinyl alcohol (PVA)-based resin.

The thickness of the resin layer is preferably from 5 μm to 300 μm, more preferably from 30 μm to 250 μm, still more preferably from 50 μm to 200 μm, particularly preferably from 50 μm to 100 μm.

The modulus of elasticity of the resin layer at 23° C. is preferably from 1 GPa to 10 GPa, more preferably from 2 GPa to 7 GPa, still more preferably from 2 GPa to 5 GPa. When the modulus of elasticity falls within such ranges, an optical laminate excellent in impact resistance and puncture resistance can be obtained.

B-3-1. Polarizing Plate

As described above, in one embodiment, the resin layer is a polarizing plate. The polarizing plate includes a polarizer and a protective film arranged on at least one side of the polarizer. The thickness of the polarizing plate is preferably from 5 µm to 300 µm, more preferably from 10 µm to 250 µm, still more preferably from 25 µm to 200 µm, particularly preferably from 25 µm to 150 µm.

(Polarizer)

The thickness of the polarizer is not particularly limited, and an appropriate thickness may be adopted depending on purposes. The thickness is typically from about 1 µm to about 80 µm. In one embodiment, a thin polarizer is used, and the thickness of the polarizer is preferably 20 µm or less, more preferably 15 µm or less, still more preferably 10 µm or less, particularly preferably 6 µm or less. With the use of such thin polarizer, a thin optical laminate can be obtained.

The polarizer preferably exhibits absorption dichroism at any wavelength in the wavelength range of from 380 nm to 780 nm. The polarizer has a single layer transmittance of preferably 40.0% or more, more preferably 41.0% or more, still more preferably 42.0% or more, particularly preferably 43.0% or more. The polarizer has a polarization degree of preferably 99.8% or more, more preferably 99.9% or more, still more preferably 99.95% or more.

The polarizer is preferably an iodine-based polarizer. More specifically, the polarizer may be formed of an iodine-containing polyvinyl alcohol-based resin (hereinafter referred to as "PVA-based resin") film.

Any appropriate resin may be adopted as a PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizer excellent in durability. When the saponification degree is excessively high, gelling may occur.

The average polymerization degree of the PVA-based resin may be appropriately selected depending on purposes. The average polymerization degree is typically from 1,000 to 10,000, preferably from 1,200 to 5,000, more preferably from 1,500 to 4,500. The average polymerization degree may be determined in conformity with JIS K 6726-1994.

A production method for the polarizer is, for example, a method (I) including stretching and dyeing a PVA-based resin film alone, or a method (II) including stretching and dyeing a laminate (i) having a resin substrate and a polyvinyl alcohol-based resin layer. Detailed description of the method (I) is omitted because the method is well known and commonly used in the art. The production method (II) preferably includes the step of stretching and dyeing the laminate (i) having the resin substrate and the polyvinyl alcohol-based resin layer formed on one side of the resin substrate to produce a polarizer on the resin substrate. The laminate (i) may be formed by applying an application liquid containing a polyvinyl alcohol-based resin onto the resin substrate and drying the applied liquid. In addition, the laminate (i) may be formed by transferring a polyvinyl alcohol-based resin film onto the resin substrate. For example, the details of the production method (II) are described in JP 2012-73580 A, which is incorporated herein by reference.

(Protective Film)

Any appropriate resin film may be adopted as the protective film. As a material for forming the protective film, there are given, for example: a polyester-based resin, such as polyethylene terephthalate (PET); a cellulose-based resin, such as triacetylcellulose (TAC); a cycloolefin-based resin, such as a norbornene-based resin; an olefin-based resin, such as polyethylene or polypropylene; and a (meth)acrylic resin. The term "(meth)acrylic resin" refers to an acrylic resin and/or a methacrylic resin.

In one embodiment, a (meth)acrylic resin having a glutarimide structure is used as the (meth)acrylic resin. The (meth)acrylic resin having a glutarimide structure (hereinafter sometimes referred to as glutarimide resin) is described in, for example, JP 2006-309033 A, JP 2006-317560 A, JP 2006-328329 A, 2006-328334 A, JP 2006-337491 A, JP 2006-337492 A, JP 2006-337493 A, JP 2006-337569 A, JP 2007-009182 A, JP 2009-161744 A, and JP 2010-284840 A, the descriptions of which are incorporated herein by reference.

The protective film and the polarizer are laminated via any appropriate adhesive layer. The resin substrate used at the time of the production of the polarizer may be peeled before the lamination of the protective film and the polarizer, or after the lamination.

The thickness of the protective film is preferably from 4 µm to 250 µm, more preferably from 5 µm to 150 µm, still more preferably from 10 µm to 100 µm, particularly preferably from 10 µm to 50 µm.

The modulus of elasticity of the protective film at 23° C. is preferably from 1 GPa to 10 GPa, more preferably from 2 GPa to 7 GPa, still more preferably from 2 GPa to 5 GPa. When the modulus of elasticity falls within such ranges, an optical laminate excellent in impact resistance and puncture resistance can be obtained.

B-4. Pressure-Sensitive Adhesive Layer

The pressure-sensitive adhesive layer is formed of any appropriate pressure-sensitive adhesive. A pressure-sensitive adhesive containing, for example, an acrylic polymer, a silicone-based polymer, polyester, polyurethane, polyamide, polyether, or a fluorine-based or rubber-based polymer as a base polymer is used as the pressure-sensitive adhesive. Of those, an acrylic pressure-sensitive adhesive is preferably used. This is because the acrylic pressure-sensitive adhesive is excellent in optical transparency, shows moderate wettability, moderate cohesiveness, and a moderate pressure-sensitive adhesive characteristic, such as an adhesive property, and may be excellent in, for example, weatherability and heat resistance. An acrylic pressure-sensitive adhesive formed of an acrylic polymer having 4 to 12 carbon atoms is particularly preferred.

The thickness of the pressure-sensitive adhesive layer is preferably from 1 µm to 100 µm, more preferably from 3 µm to 80 µm, still more preferably from 3 µm to 50 µm. When the thickness falls within such ranges, an optical laminate that is excellent in flexibility and is excellent in impact resistance and puncture resistance can be obtained.

The modulus of elasticity of the pressure-sensitive adhesive layer at 23° C. is preferably from 0.00001 GPa to 10 GPa, more preferably from 0.001 GPa to 8 GPa, still more preferably from 0.001 GPa to 5 GPa. When the modulus of elasticity falls within such ranges, an optical laminate that is excellent in flexibility and is excellent in impact resistance and puncture resistance can be obtained.

C. Strain-Sensing Unit

The strain-sensing unit is configured to sense strain caused by an external force applied to the surface (surface opposite to the strain-sensing unit) of the optical laminate laminated on the strain-sensing unit. The strain-sensing unit may be of any appropriate configuration as long as the unit has such function.

In one embodiment, as illustrated in FIG. 1, the strain-sensing unit 20 includes the at least one strain sensor 21. More specifically, the strain-sensing unit 20 includes a transparent substrate 22 and the strain sensor 21 arranged on at least one side of the transparent substrate 22. When the strain sensors 21 are arranged on both sides of the transparent substrate 22, the strain sensor 21 arranged on one surface and the strain sensor 21 arranged on the other surface are preferably opposite to each other through the transparent substrate 22. The strain sensors 21 are arranged in any appropriate form on the transparent substrate 22. The strain sensors 21 are arranged in, for example, a grid form.

In one embodiment, the strain sensors each include a strain gauge formed from a transparent material. The strain gauge is configured to measure strain by sensing a change in resistance value intrinsic to a metal material through utilization of the fact that the resistance value changes at the time of the compression/elongation of the metal material. The strain gauge may be formed from a plurality of nanostructures, such as a nanomesh structure and a nanowire structure. A material having a low strain gauge factor is preferably used as a material for forming the strain gauge. The strain gauge factor is a characteristic intrinsic to the material for forming the strain gauge, and represents the sensitivity of the material to the strain. A strain amount ε is represented by the expression "(resistance change amount/gauge resistance)/gauge factor," and a material having a lower gauge factor has higher sensitivity to the strain. Examples of the material for forming the strain gauge include Cu, Ni, Cr, and alloys thereof.

The strain-sensing unit may include a sense-processing circuit connected to the strain sensors through wires, though the circuit is not shown. The sense-processing circuit can relate a change in resistance value of the strain gauge and the magnitude of the external force applied to the surface of the optical laminate to each other on the basis of a signal from the strain sensor that has detected the change in resistance value.

The details of the strain-sensing unit are described in, for example, US 2017/0075465 A1, the description of which is incorporated herein by reference in its entirety.

EXAMPLES

The present invention is specifically described below by way of Examples, but the present invention is not limited to these Examples. In addition, in Examples, "part(s)" and "%" are by weight unless otherwise specified.

Production Example 1

(Preparation of Adhesive)

An epoxy-based resin (manufactured by Daicel Chemical Industries, Ltd., product name: "CELLOXIDE 2021P"), another epoxy-based resin (manufactured by Daicel Chemical Industries, Ltd., product name: "EHPE 3150"), an oxetane-based resin (manufactured by Toagosei Co., Ltd., product name: "ARON OXETANE OXT-221"), an epoxy group-terminated coupling agent (manufactured by Shin-Etsu Chemical Co., Ltd., product name: "KBM-403"), and a polymerization initiator (CPI-101A manufactured by San-Apro Ltd.) were mixed at a ratio of 60:10:20:4:2 to prepare a UV-curable adhesive.

Example 1

A glass film (manufactured by Nippon Electric Glass Co., Ltd., product name: "GA-10G," thickness: 50 µm) and a polyethylene terephthalate film (manufactured by Toray Industries, Inc., product name: "Lumirror S10," thickness: 100 µm, modulus of elasticity: 4 GPa) were laminated via the adhesive prepared in Production Example 1. UV light (integrated light quantity: 300 mJ/cm$^2$) was applied to the resultant laminate to provide a laminate A having the configuration "glass film/adhesive layer (thickness: 1 µm, modulus of elasticity: 1 GPa)/resin layer (PET)."

A pressure-sensitive adhesive film (manufactured by Nitto Denko Corporation, product name: "LUCIACS CS9861UAS," pressure-sensitive adhesive layer thickness: 25 µm) was laminated on the resin layer (PET) side of the laminate A to provide a laminate B.

Next, a film present above a liquid crystal panel in a smartphone (manufactured by Apple Inc., product name: "i-Phone X") was peeled, and the laminate B was mounted on the liquid crystal panel via the pressure-sensitive adhesive layer.

The moduli of elasticity of the adhesive layer and the resin layer were measured with an autograph (manufactured by Shimadzu Corporation, product name: "AG-IS") under the following conditions.

<Method of Measuring Modulus of Elasticity>

| | |
|---|---|
| Measurement temperature: | 23° C. |
| Sample size: | 50 µm thick by 2 cm wide by 15 cm long |
| Chuck-to-chuck distance: | 10 cm |
| Tensile rate: | 10 mm/min |

Example 2

A sensor device was obtained in the same manner as in Example 1 except that the thickness of the glass film was changed to 100 µm.

Comparative Example 1

A sensor device was obtained in the same manner as in Example 1 except that the thickness of the glass film was changed to 300 µm.

Comparative Example 2

A sensor device was obtained in the same manner as in Example 1 except that the adhesive layer for forming the laminate A was changed to a pressure-sensitive adhesive layer (manufactured by Nitto Denko Corporation, acrylic pressure-sensitive adhesive, product name: "LUCIACS CS9861UAS," pressure-sensitive adhesive layer thickness: 25 µm).

<Evaluation>

The sensor devices obtained in Examples and Comparative Examples were subjected to the following evaluations. The results are shown in Table 1.

1. Sensitivity

The glass surface of the laminate B mounted on the smartphone was pressed with a finger, and a case in which the display of the smartphone responded to the pressing was evaluated as "○", while a case in which the response delayed or the display did not respond thereto was evaluated as "x". The response was recognized while one polarizing plate (manufactured by Nitto Denko Corporation, product name: "NPF-SEG1425DU") was simply held up toward a viewer side (onto the glass) so that the display screen of the smartphone was able to be viewed.

2. Impact Resistance

A case in which when a 100-gram iron ball was dropped from a height of 50 mm toward the glass surface of the laminate B mounted on the smartphone, the glass film or display screen of the laminate did not break was evaluated as "○", and a case in which the glass film or the display screen broke was evaluated as "x".

TABLE 1

| | Thickness of glass film (μm) | Resin layer | Modulus of elasticity of resin layer (GPa) | Adhesive layer | Modulus of elasticity of adhesive layer (GPa) | Sensitivity | Impact resistance |
|---|---|---|---|---|---|---|---|
| Example 1 | 50 | PET | 4 | Epoxy-based adhesive | 1 | ○ | ○ |
| Example 2 | 100 | PET | 4 | Epoxy-based adhesive | 1 | ○ | ○ |
| Comparative Example 1 | 300 | PET | 4 | Epoxy-based adhesive | 1 | x | ○ |
| Comparative Example 2 | 100 | PET | 4 | Acrylic pressure-sensitive adhesive | 0.2 | ○ | x |

REFERENCE SIGNS LIST

10 optical laminate
11 glass film
12 adhesive layer
13 resin layer
20 strain-sensing unit
100 sensor device

The invention claimed is:

1. A sensor device, comprising:
   an optical laminate including a glass film, an adhesive layer, a resin layer, and a pressure-sensitive adhesive layer in the stated order; and
   a strain-sensing unit,
   wherein the glass film has a thickness of from 20 μm to 150 μm;
   the resin layer and the pressure-sensitive adhesive layer are directly in contact with each other;
   a modulus of elasticity of the adhesive layer at 23° C. ranges from 0.5 GPa to 15 GPa; and
   the strain-sensing unit is configured to sense strain caused by an external force applied to a surface of the optical laminate.

2. The sensor device according to claim 1, wherein the strain-sensing unit is arranged on a pressure-sensitive adhesive layer side of the optical laminate.

3. The sensor device according to claim 1, wherein the glass film and the resin layer are arranged while no layer other than the adhesive layer is caused to exist between the glass film and the resin layer.

4. The sensor device according to claim 1, wherein the resin layer is a polarizing plate.

5. The sensor device according to claim 1, wherein the resin layer has a modulus of elasticity at 23° C. of from 1 GPa to 10 GPa.

* * * * *